INVENTORS
MICHAEL O. RABIN,
LUTHER H. HAIBT,
BY Thomas & Crickenberger
ATTORNEYS Jan. 16, 1968  L. H. HAIBT ETAL  3,364,468
CRYOGENIC FAULT OR ERROR-DETECTING AND CORRECTING
SYSTEM HAVING SPARE CHANNEL SUBSTITUTION
Filed Dec. 30, 1959  6 Sheets-Sheet 4

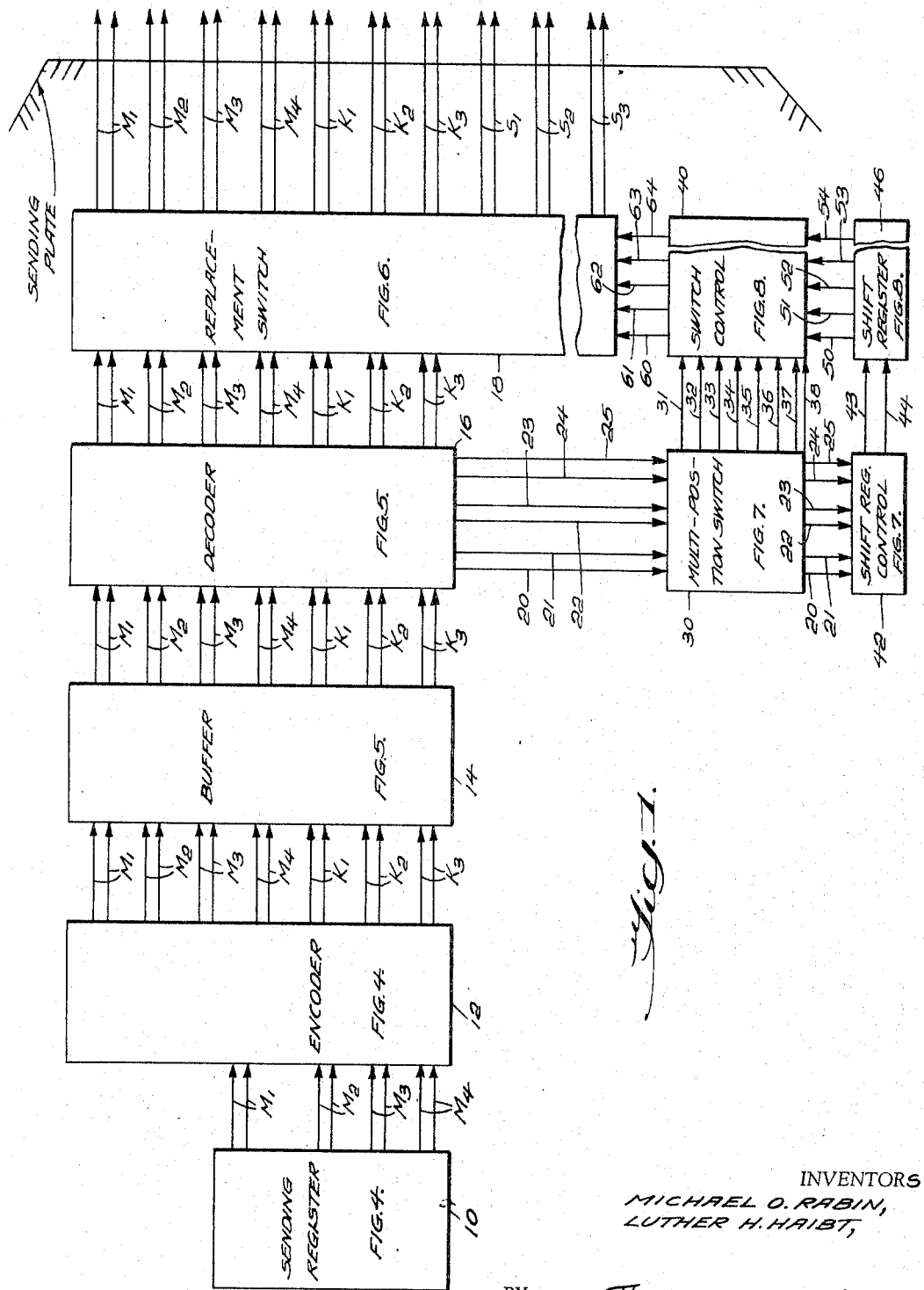

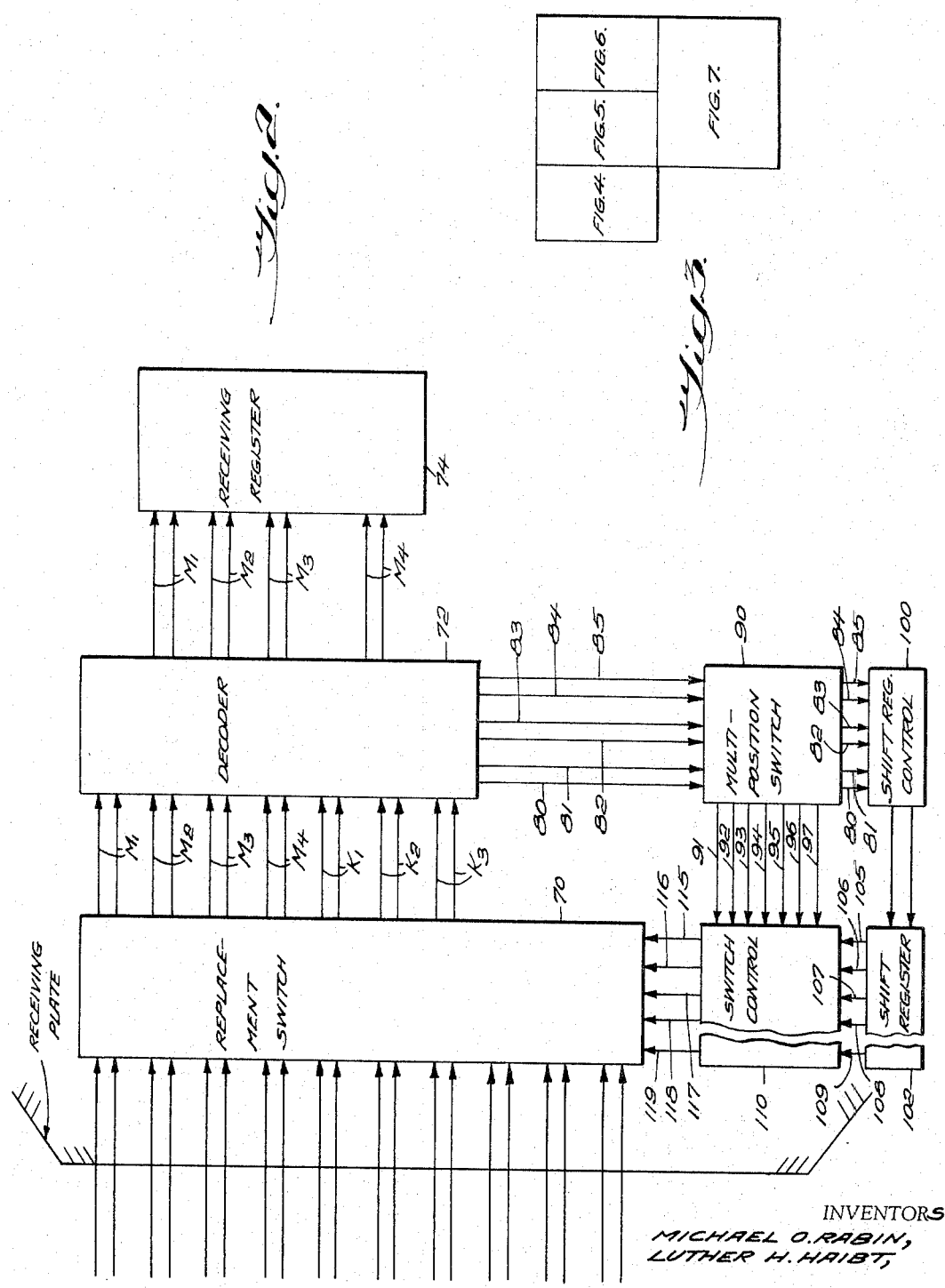

INVENTORS
MICHAEL O. RABIN,
LUTHER H. HAIBT,

BY Thomas & Crickenberger
ATTORNEYS

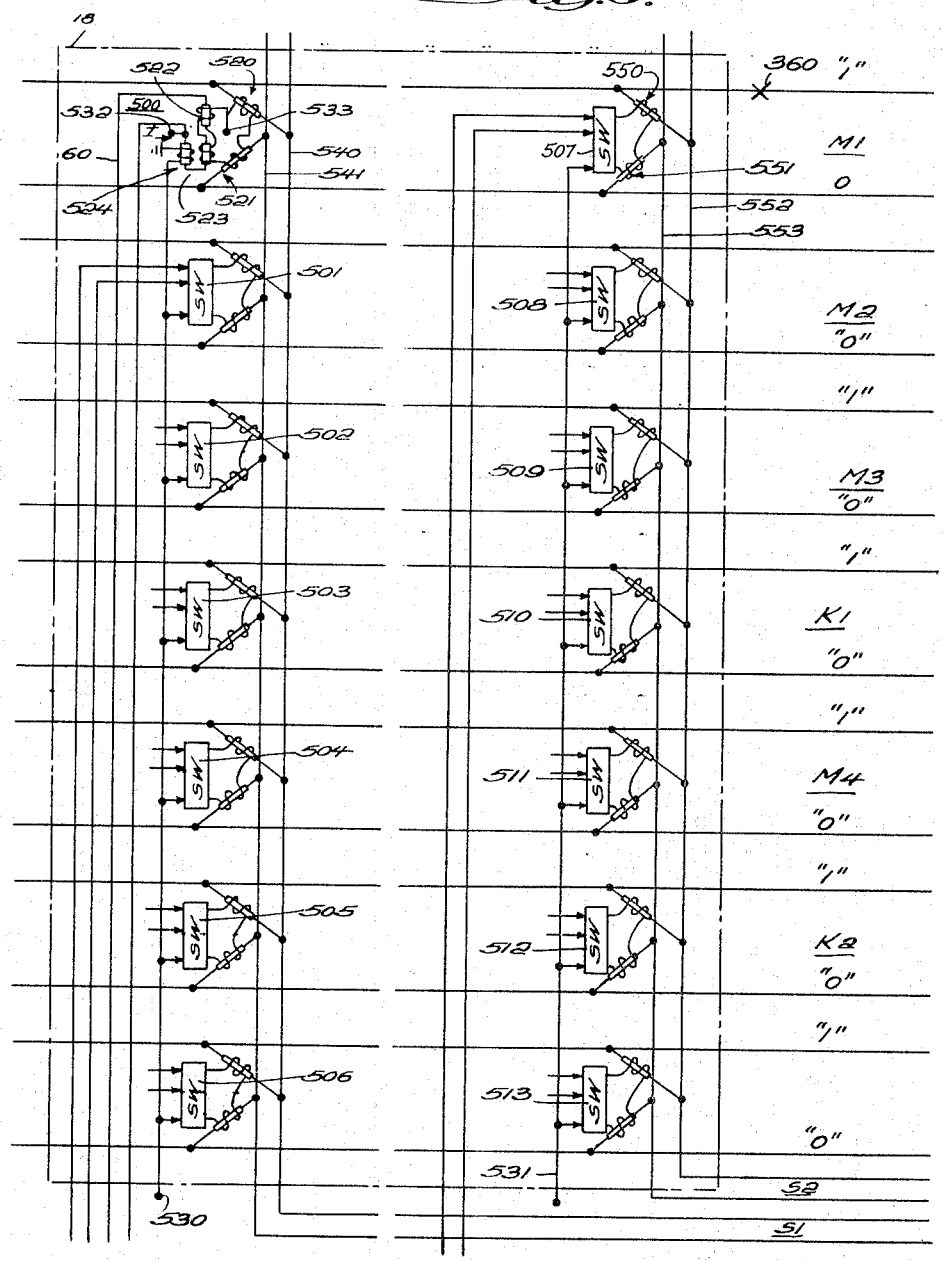

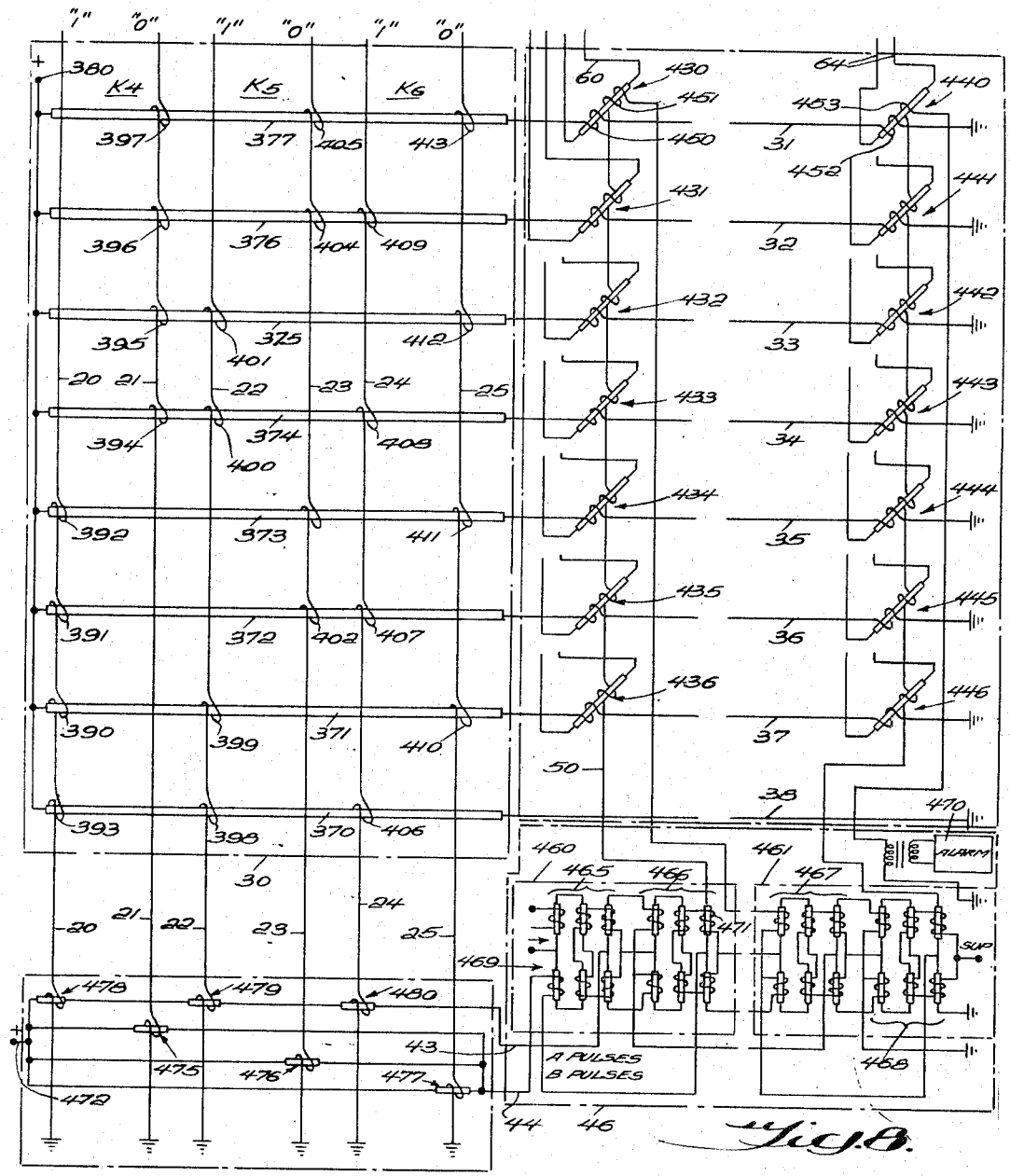

United States Patent Office 3,364,468
Patented Jan. 16, 1968

3,364,468
CRYOGENIC FAULT OR ERROR-DETECTING AND CORRECTING SYSTEM HAVING SPARE CHANNEL SUBSTITUTION
Luther H. Haibt, Croton-on-Hudson, N.Y., and Michael O. Rabin, Jerusalem, Israel, assignors to International Business Machines Corporation, New York, N.Y., a corporation of New York
Filed Dec. 30, 1959, Ser. No. 862,940
3 Claims. (Cl. 340—147)

This invention relates to cryogenic circuitry and more particularly to such circuitry employing an error-detecting and correcting device.

Where information is transmitted from one location to another in machines using cryogenic elements the problem of broken lines arises. A broken line is very difficult to repair when the elements are buried in a liquefied gas bath. Thin film lines, which serve as conductors between cryogenic elements in different locations, may be broken during the process of manufacturing, during temperature cycling or during operation from such causes as overload current or mechanical force such as jarring. It is felt that the thermal stress on connecting lines between cryogenic elements as a result of temperature cycling between room temperature and the operating temperature is a usual source of breakage.

It is the practice in some instances to construct machines from a number of plates on which logic or memory circuits are printed. Each plate may have a number of output leads which run to the edge of the plate, and from there connecting wires may run to the input leads of other plates. The interplate wires may be connected to the leads on the plates by solder joints or other suitable form of physical connection. Once properly manufactured and tested, the circuits printed on the plates may be assumed to function with a good degree of reliability. The solder joints or other physical connecting device has a very small chance of breaking. It is the breakage of the interplate wires during submersion in a liquefied bath that creates the problem which this invention is intended to overcome.

According to this invention a transmission system is provided which uses M information channels, K channels for code checking purposes and S channels as spare or standby channels. The code checking channel K may be employed for parity checking purposes. Various coding schemes are possible, but for simplicity of illustration a well known Hamming error-correcting and detecting code is used which employs four information channels with three code checking channels. This combination of information and code checking channels is sometimes referred to as the four out of seven code. With this and other codes it is possible to detect errors which may occur in the transmission of signals on the M and K channels. Further, a single error may be located by indicating the defective channel, and it is further possible to correct the defective channel by substituting a spare channel therefor.

It might seem desirable to be able to detect and locate more than a single error at one time in an information transmission system. The codes for error correction, however, become rapidly more complicated with an increase in the number of errors to be corrected. Multiple error correction codes entail a larger number of code channels to carry check bits so that the system tends to become too large for practical applications. On the other hand, if the rate of interplate transmission is great, then a single error correction device provides very good reliability. To illustrate, assume that on the average one of the M plus K channels, independent of the remaining channels, becomes defective every five hours. Assume also that the rate of interplate communication is one thousand messages per second and a defective channel is replaced within the same cycle. The only way in which an error can go undetected is for two wires to break simultaneously in the time between one information transmission and the next. This is calculated to happen only once in every $(5 \times 3600 \times 1000)^2$ cycles. Dividing this number by the number of cycles per hour $(3600 \times 1000)$ yields $9 \times 10^7$ hours. It is seen, therefore, that under the assumed circumstances a single error correction and detection device results in a high degree of reliability.

In an illustrative arrangement according to this invention cryotrons are employed, and this requires the use of two lines for each channel. Current is supplied on one line to represent a binary one, and current is supplied on the other line to represent a binary zero. Current flows in only one of the two lines at any given instant. There are M information channels, K code channels and S spare channels provided. According to one aspect of this invention the transmission system includes provision for detecting the existence of a defective channel. This is necessary where error free transmission is required, and the detection of a defective channel makes it possible to eliminate erroneous data transmission. The error detection may be accomplished by using an encoder which responds to data on the M information channel and establishes code checking signals on the K code channels. Information on the M channels and the code checking data on the K code channels is presented to a decoder, and the decoder in turn provides given output signal combinations whenever a defective channel exists.

According to another aspect of this invention it is important to define the location of the defective channel so that suitable repairs may be made or use of a defective channel may be discontinued. For this purpose a multi-position switch is provided which responds to the error-indicating signals from the decoder and energizes a given one of a plurality of output lines. These output lines correspond in number to the number of the M and K channels employed, and there is a corresponding output line for each of these channels. The output line energized is therefore indicative of the location of the defective channel.

According to a further aspect of this invention provision is made to correct the defective channel by replacing it with a spare channel. This may be performed by operating a replacement switch which has the M information channels, the K code channels and the S spare channels connected thereto. The S spare channels are isolated from the M and K channels, and when the replacement switch is operated a spare channel is substituted for a defective one of the M or K channels.

A still further feature of this invention is the provision of a self-repairing arrangement whereby a spare channel is automatically substituted for a defective one of the M channels, K channels or even a defective spare channel. For this purpose a switch control is provided which responds to signals on the output lines of the multi-position switch, and the switch control includes additional input lines one of which is energized to indicate the spare channel to be employed. The switch control in turn is operated to energize one of a plurality of its output lines, and the signal on the energized output line operates the replacement switch to replace the defective channel with a spare channel.

It is another feature of this invention to provide for the use of many spare channels so that error free transmission may be maintained should a large number of defects occur in the M and K channels. For this purpose the number of spare channels S is made as large as desired, consistent with practical and economical limitations. Where thin film devices are employed the number of spare channels may be on the order of 40 or 50 channels without involving much additional space or weight, and production costs can be maintained within reasonable limits. It is important in operation to remember or keep track of the spare channels which have been used to replace defective channels so as to avoid attempts to use the same spare channel twice. For this purpose a shift register, or other suitable memory device, may be employed to select a given one of the additional input lines to the switch control. The shift register may be operated successively as errors occur to energize each of the additional input lines to the switch control in turn and thereby successively select the spare channels as a series of defective channels occur. In order to maintain the automatic self-preparing aspect, the shift register may be operated by a shift register control which responds to signals from the multiposition switch and provides signals to the shift register to effect a shift operation once for each defective channel found.

Information is normally sent from a register on one plate to a register on another plate. These plates may be referred to as the sending plate and the receiving plate with the registers disposed thereon as the sending register and the receiving register, respectively. When replacing a defective M or K channel with a spare S channel, both ends of the spare S channel must be substituted for both ends of the defective channel. Accordingly, the decoder, the multiposition switch, the shift register control, the shift register, the switch control and the replacement switch constitute a circuit arrangement which must be provided on the sending register with a similar arrangement on the receiving register to substitute both ends of the spare channel for the defective channel.

These and other features of this invention may be more fully appreciated when considered in the light of the following specification and drawings in which:

FIGS. 1 and 2 show in block form an illustrative arrangement of a system according to this invention;

FIG. 3 shows how FIGS. 4 through 8 should be arranged with respect to one another in order for them to illustrate properly the system of FIG. 1;

FIG. 6 depicts in detail the replacement switch of FIG. 1;

FIG. 7 shows in detail the multiposition switch and the shift register control of FIG. 1; and FIG. 8 illustrates in detail the shift register and the switch control of FIG. 1.

Figure 4:
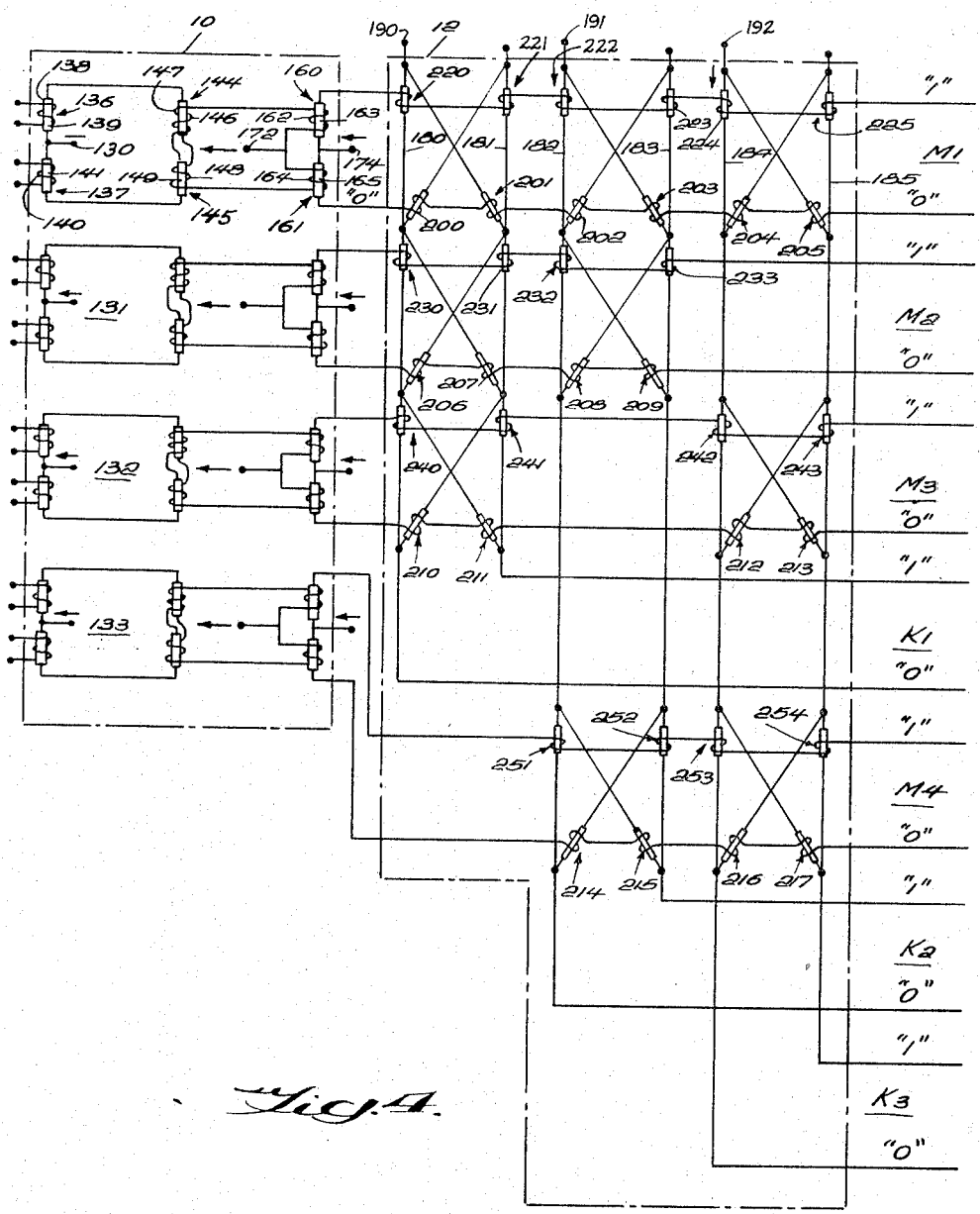
FIG. 4 illustrates in detail the sending register and encoder of FIG. 1.

An illustrative system arrangement according to this invention is illustrated in block form in FIGS. 1 and 2. It includes a sending register 10 which transmits signals representative of information on channels M1, M2, M3 and M4 to a receiving register 74 in FIG. 2. Upon leaving the sending register 10 in FIG. 1 these signals are applied to an encoder 12 and then continue on their respective channels. In response to information signals on the information channels M1 through M4 the encoder 12 generates three code bits K1 through K3. The signals on M and K channels from the encoder 12 represent a seven position single-error-correcting code. A code of this type is well known, and an explanation of it may be found in Reissue Patent 23,601. Data on the information channels M1 through M4 and the code channels K1 through K3 is conveyed from the encoder 12 to a buffer 14 and then to a decoder 16. The buffer 14 serves to isolate electrically the encoder 12 from the decoder 16. The channels M1 through M4 and the code channels K1 through K3 pass through the decoder 16 to a replacement switch 18. The decoder 16 serves as an error detecting device. If, for example, an error occurs in one of the information or code channels as the result of a break or open circuit in either or both wires of a given channel, the decoder 16 establishes signals on the lines 20 through 25 which indicate that an error exists and also indicate the location of the defective channel.

Signals on the lines 20 through 25 are conveyed to a multiposition switch 30 which in turn decodes this information and selects one of the lines 31 through 37. If an error occurs in channel M1, the line 31 is selected. If an error occurs in channel M2, then the line 32 is selected. The lines 31 through 37 correspond to respective channels M1 through M4 and K1 through K3. When one of the lines 31 through 37 is selected, it is energized with a current, and this current is supplied to a switch control 40. The lines 20 through 25 pass through the multiposition switch 30 to a shift register control 42. The shift register control in turn operates in response to signals on these lines to energize the lines 43 and 44 to step a shift register 46. The shift register 46 energizes a given one of the lines 50 through 54. Whenever one of the lines 31 through 37 and one of the lines 50 through 54 are energized, the switch control 40 operates to energize a selected one of the lines 60 through 64. The energized one of these lines then operates the replacements switch 18 to replace the defective one of the channels M1 through M4 or K1 through K3 with a given one of the spare channels S1 through S3. For each of the spare channels S1 through S3 there is a corresponding stage of the shift register 46. Stated alternatively, there are as many stages in the shift register 46 as there are spare channels employed. Initially, the shift register 46 energizes the line 50 which in turn selects spare channel S1 to replace the defective channel indicated by the energized one of the conductors 31 through 37. When a second defective channel is detected, the shift register 46 energizes the conductor 51 to operate the switch control 40 and thereby substitute the spare channel S2 for the defective channel indicated by the energized one of the lines 31 through 37. In similar fashion, the shift register 46 energizes the line 52 to operate the switch control 40 when the spare channel S3 is substituted for a defective channel as indicated by an energized one of the lines 31 through 37. The shift register 46 may be stepped along once for each defective channel detected in order to substitute other spare wires, not shown, for defective channels.

The replacement switch 18 in FIG. 1 connects the spare channels S1, S2 or S3 in place of a defective one of the channels M1 through M4 or K1 through K3 at the sending plate in FIG. 1. It is necessary to connect the opposite end of the spare channels S1, S2 or S3 to the terminals of the defective channel at the receiving plate in FIG. 2. For this purpose the same information supplied on channels M1 through M4 and K1 through K3 to the replacement switch 18 in FIG. 1 is also applied to the replacement switch 70 in FIG. 2. The information on the channels M1 through M4 and K1 through K3 in FIG. 1 is supplied also through a replacement switch 70 and a decoder 72 to a receiving register 74 in FIG. 2. If a given channel is defective, the decoder 72 determines this and supplies information signals on lines 80 through 85 representative of the location of the defective channel. These signals are supplied to a multiposition switch 90 and to a shift register control 100. The multiposition switch 90 energizes one of the lines 91 through 97 depending upon whether a respective one of the channels M1 through M4 and K1 through K3 is defective. The shift register control 100 operates a shift register 102 which in turn energizes one of the lines 105 through 109. The energized one of these lines and the energized one of the lines 90 through 97 operate a switch control 110 which in turn energizes one of the output lines 115 through 119. The energized one of these lines operates the replacements switch 70 to connect a given one of the spare channels S1, S2 or S3 to the terminals of the defective channel. As the terminals of the spare channel are connected to the terminals of the defective channel at the replacement switch 70 on the receiving plate in FIG. 2, the terminals at the opposite end of the spare channel are connected to the terminals of the defective channel at the replacement switch 18 in FIG. 1. Hence a spare channel S1, S2 or S3 may be substituted for a defective one of the channels M1 through M4 or K1 through K3, and the accurate transmission of data may be resumed.

The replacement switch 70, the decoder 72, the multiposition switch 90, the shift register control 100, the shift register 102, and the switch control 110 in FIG. 2 may be the same in construction and operation as the respective replacement switch 18, the decoder 16, the multiposition switch 30, the shift register control 42, the shift register 46 and the switch control 40 in FIG. 1. Likewise, the sending register 10 in FIG. 1 may be the same in construction and operation as the receiving register 74 in FIG. 2. Accordingly, a detailed description of the construction and operation of the component parts illustrated in block form in FIG. 1 suffices for an understanding of the corresponding component parts in FIG. 2. FIGS. 4 through 8 show the details of the component parts of FIG. 1, and if arranged as indicated in FIG. 3, they formulate the system illustrated in FIG. 1

Referring next to FIG. 4, the sending register 10 and encoder 12, shown in block form in FIG. 1, are illustrated in detail. The sending register 10 in FIG. 4 includes cryotron-type flip-flops 130 through 133. The cryotrons provide outputs indicative of which of two loops is carrying a current at any particular time. Each cryotron is represented as a conventional wire-wound cryotron in the interest of providing a more graphic circuit illustration although it is to be understood that the circuit is preferably constructed of thin film devices of the type, for example, shown and described in copending application Serial No. 625,512 filed on November 30, 1956, by R. L. Garwin and assigned to the assignee of this invention. Furthermore, the remaining cryotrons illustrated throughout FIGS. 4 through 8 are represented as conventional wire wound cryotrons in the interest of providing a more graphic circuit illustration, and it is to be understood that they likewise are preferably constructed of thin film devices. These devices may be of the type referred to in the above identified application of R. L. Garwin.

The circuits of this invention are operated at low temperatures such as by emersion in liquid helium, for example. The circuit lines or wires and the control coil of each cryotron are made of a hard superconductor such as Niobium, for instance, and the gate element of each cryotron is made of a soft superconductor such as tantalum, for example. The currents employed create magnetic field in the control coil which exceeds the critical field of the gate, but the magnetic field does not exceed the critical field of the control coil or the connecting lines or wires.

The cryotron flip-flop 130 in FIG. 4 includes a pair of input cryotrons 136 and 137. The cryotron 136 has a control winding 138 disposed about a gate 139. In like fashion the cryotron 37 has a control winding 140 disposed about a gate 141. The control windings are energized to control the state of the flip-flop 130. A pair of cryotrons 144 and 145 are cross-coupled to serve as a flip-flop. That is, only one of these cryotrons is operated at a given instant except during a transition or change in state when both cryotrons may temporarily be on or off. The cryotron 144 has a control winding 146 disposed about a gate 147, and the cryotron 145 has a control winding 148 disposed about a gate 149. The gate 149 has its lower end connected to the gate 141 of the cryotron 137, and the upper end of the gate 149 is connected to the control winding 146 of the cryotron 144. The gate 147 of the cryotron 146 has its upper end connected to the gate 139 of the cryotron 136, and the lower end of the gate 147 is connected to the control winding 148 of the cryotron 145. It is seen, therefore, that the cryotrons 144 and 145 are cross-connected so as to form a flip-flop circuit.

A pair of output cryotrons 160 and 161 are provided in the flip-flop circuit 130. The cryotron 160 has a control winding 162 disposed about a gate 163, and the cryotron 161 has a control winding 164 disposed about a gate 165. The control winding 162 of the cryotron 160 has its upper end connected to the control winding 146 of the cryotron 144, and the lower end of the control winding 162 is connected to the upper end of the control winding 164 of the cryotron 161. The two control windings 162 and 164 are connected to a terminal 172 which is coupled to one side of a current source, not shown. The lower end of the control winding 164 is connected to the control winding 148 of the cryotron 145.

The flip-flop 130 in FIG. 4 responds to a signal applied to the input winding 138 to set the flip-flop in the Zero state. When energized with a current of proper magnitude, the input winding 138 develops a magnetic field which drives the gate 139 resistive, and current entering the terminal 170 is diverted through the gate 141, the gate 149, the winding 146, the winding 162, and to the exit terminal 172. The energizing current through the windings 146 and 162 drives the associated gates 147 and 163 resistive or normal. This prevents current from the terminal 170 from passing through the gate 147 when the input signal to the winding 138 terminates. Consequently, current flow continues in the manner indicated above through the cryotrons 144 and 145 to hold the flip-flop 130 in the Zero state. Since the gate 163 is normal, current from a terminal 174 is diverted through the superconductive gate 165 to the Zero line of channel M1. Current on this line flows to the terminal 176 of the buffer 14 in FIG. 5.

Whenever it is desired to set the flip-flop 130 in the One state, a current is applied to the input winding 140. The gate 141 is thereby driven normal, and current from the terminal 170 is diverted through the super-conductive gate 139, the gate 147, the winding 148, the winding 164 and to the exit terminal 172. As a result, the gates 149 and 165 are driven normal. The cryotrons 144 and 145 continue to carry current in this manner after the input pulse to the coil 140 terminates. Since the gate 165 is maintained normal, current from the terminal 174 is diverted through the super-conductive gate 163 to the One line of channel M1, and this current flows to the terminal 176 of the buffer 14 in FIG. 5. It is seen, therefore, that flip-flop 130 may be set in the Zero or the One state to thereby supply a current on the Zero or One line of the channel M1. The flip-flops 131 through 133 operate in like fashion in response to input signals to supply current on either the Zero or the One line of associated channels M2 through M4. It is pointed out that current flows at all times through either the Zero or the One line of each of the channels M1 through M4 except during a transition in state of the associated ones of the flip-flops 130 through 133 at which time the current flow may be changing from the Zero line to the One line or vice versa. Accordingly, information is represented at all times in the channels M1 through M4 by current flow in the One or the Zero line of each channel.

The encoder 12, illustrated in block form in FIG. 1, is shown in detail in FIG. 4. Referring again to FIG. 4, this encoder includes three pairs of vertical wires with associated cyrotrons as shown. The first pair of vertical wires 180 and 181 serve as the Zero and One lines, respectively, of a code channel K1. The vertical lines 182 and 183 serves as the respective Zero and One lines of a code channel K2; while the vertical wires 184 and 185 serve as the Zero and One lines respectively of a code channel K3.

The purpose of the encoder 12 is to establish signals on the code channels K1, K2 and K3 dependent upon what information appears on the information channels M1 through M4. Note that the encoder 12 does not alter the information conveyed by the information channels M1 through M4. This is because the currents in the information channels M1 through M4 pass through control coils of the cryotrons in the encoder 12, not through the gate elements. Current from terminals 190, 191 and 192 ultimately establish signals in the code channels K1, K2 and K3, respectively. The current in the vertical wires 180 through 185 passes through the gate elements of the associated cryotrons. For instance, the current from terminal 190 is diverted back and forth between the wires 180 and 181 as determined by the current supplied to the One and Zero lines of the channels M1 through M4. Table I illustrates the information established in the channels M1 through M4 and the corresponding code information established in the channels K1 through K3 by operation of the encoder 12.

TABLE I

| Value | M4 | M3 | M2 | M1 | K1 | K2 | K3 |
|---|---|---|---|---|---|---|---|
| 0  | 0 | 0 | 0 | 0 | 0 | 0 | 0 |
| 1  | 0 | 0 | 0 | 1 | 1 | 1 | 1 |
| 2  | 0 | 0 | 1 | 0 | 1 | 1 | 0 |
| 3  | 0 | 0 | 1 | 1 | 0 | 0 | 1 |
| 4  | 0 | 1 | 0 | 0 | 1 | 0 | 1 |
| 5  | 0 | 1 | 0 | 1 | 0 | 1 | 0 |
| 6  | 0 | 1 | 1 | 0 | 0 | 0 | 1 |
| 7  | 0 | 1 | 1 | 1 | 1 | 0 | 0 |
| 8  | 1 | 0 | 0 | 0 | 0 | 1 | 1 |
| 9  | 1 | 0 | 0 | 1 | 1 | 0 | 0 |
| 10 | 1 | 0 | 1 | 0 | 1 | 0 | 1 |
| 11 | 1 | 0 | 1 | 1 | 0 | 1 | 0 |
| 12 | 1 | 1 | 0 | 0 | 1 | 1 | 0 |
| 13 | 1 | 1 | 0 | 1 | 0 | 0 | 1 |
| 14 | 1 | 1 | 1 | 0 | 0 | 0 | 0 |
| 15 | 1 | 1 | 1 | 1 | 1 | 1 | 1 |

In order to illustrate the operation of the encoder 12, assume that the flip-flops 130 through 133 each are set to the Zero state. Current then flows through the Zero lines of channels M1 through M4. The current in the Zero line of channel M1 drives the cryotrons 200 through 205 normal, and the current in the Zero line of channel M2 drives the cryotrons 206 through 209 normal. The current in the Zero line of channel M3 drives the cryotrons 210 through 213 normal, and the current in the Zero line of channel M4 drives the cryotrons 214 through 217 normal. The cryotrons 220 through 225 are rendered superconductive because no current flows in the One line of the channel M1, and the cryotrons 230 through 233 are rendered superconductive because no current flows in the One line of the channel M2. The cryotrons 240 through 243 are rendered superconductive since no current flows in the One line of the channel M3, and the cryotrons 251 through 254 are rendered superconductive since no current flows in the One line of channel M4.

From the foregoing conditions, it is readily seen that current from the terminal 190 flows down the line 180 because the cryotrons 220, 230 and 240 are superconductive and the cryotrons 201, 207 and 211 are normal. Therefore, current flows in the Zero line of code channel K1. It likewise is seen that current from the terminal 191 flows down the line 182 because the cryotrons 222, 232 and 251 are superconductive while the cryotrons 203, 209 and 215 are normal. Consequently, current flows in the Zero line of the code channel K2. Similarly, current from the terminal 192 flows down the line 184 because the cryotrons 224, 242 and 253 are superconductive, and the cryotrons 205, 213 and 217 are resistive. Hence current flows in the Zero line of the code channel K3. Accordingly, it is seen that when information channels M1 through M4 represent Zero, the encoder 12 in FIG. 4 establishes Zero in the code channels K1 through K3. The value of this 7-bit combination is indicated as Zero in Table I above.

To illustrate by a further example, assume that the value One is to be represented by the information channels M1 through M4. As shown in Table I above, information channel M1 carries a One, and information channels M2 through M4 carry a Zero. The encoder 12 must establish Ones in code channels K1, K2 and K3. The situation here is similar to the situation in the above described illustration except current flows in the One line of channel M1, not in the Zero line of this channel. Consequently, the cryotrons 220 through 225 are rendered normal; whereas, the cryotrons 220 through 205 are rendered superconductive since no current flows in the Zero line. Current from the terminal 190 is diverted from the line 180 because the cryotron 220 is normal, and the cryotron 201 is superconductive. As a result the current flows through the superconductive cryotron 201 to the line 181 and continues down this line since the cryotrons 231 and 241 are superconductive, and the cryotrons 206 and 210 are normal. Consequently, current flows in the One line of the code channel K1. Current from the terminal 191 is diverted from the line 182 because the cryotron 222 is normal, and the cryotron 203 is superconductive. Hence this current flows through the superconductive cryotron 203 and then down the line 183 through the superconductive cryotrons 233 and 252. The cryotrons 208 and 214 are normal. Hence it is seen that current flows in the One line of the code channel K2. The current from the terminal 192 is diverted from the line 184 by the normal cyrotron 224 through the superconductive cryotron 205 to the line 185. Current flows down this line through the superconductive cryotrons 243 and 254 because the cryotrons 212 and 216 are normal. Thus, current flows in the One line of the code channel K3. It is seen, therefore, that the encoder 12 establishes Ones in each of the code channels K1 through K3 whenever the information channel M1 carries a One and each of the information channels M2 through M4 carries a Zero. This combination of signals represents a value of One as indicated in Table I above. The operation of the decoder 12 in FIG. 4 is establishing the code bits for code channels K1 through K3 in response to information signals on the channels M1 through M4 may be readily understood for the remaining values in Table I by proceeding in like fashion as outlined above. The code bits K1 through K3 may be determined readily by observing how the currents from the terminals 190 through 192 are diverted on the vertical lines 180 through 185 in response to the various combinations of information signals on the channels M1 through M4.

Figure 5:
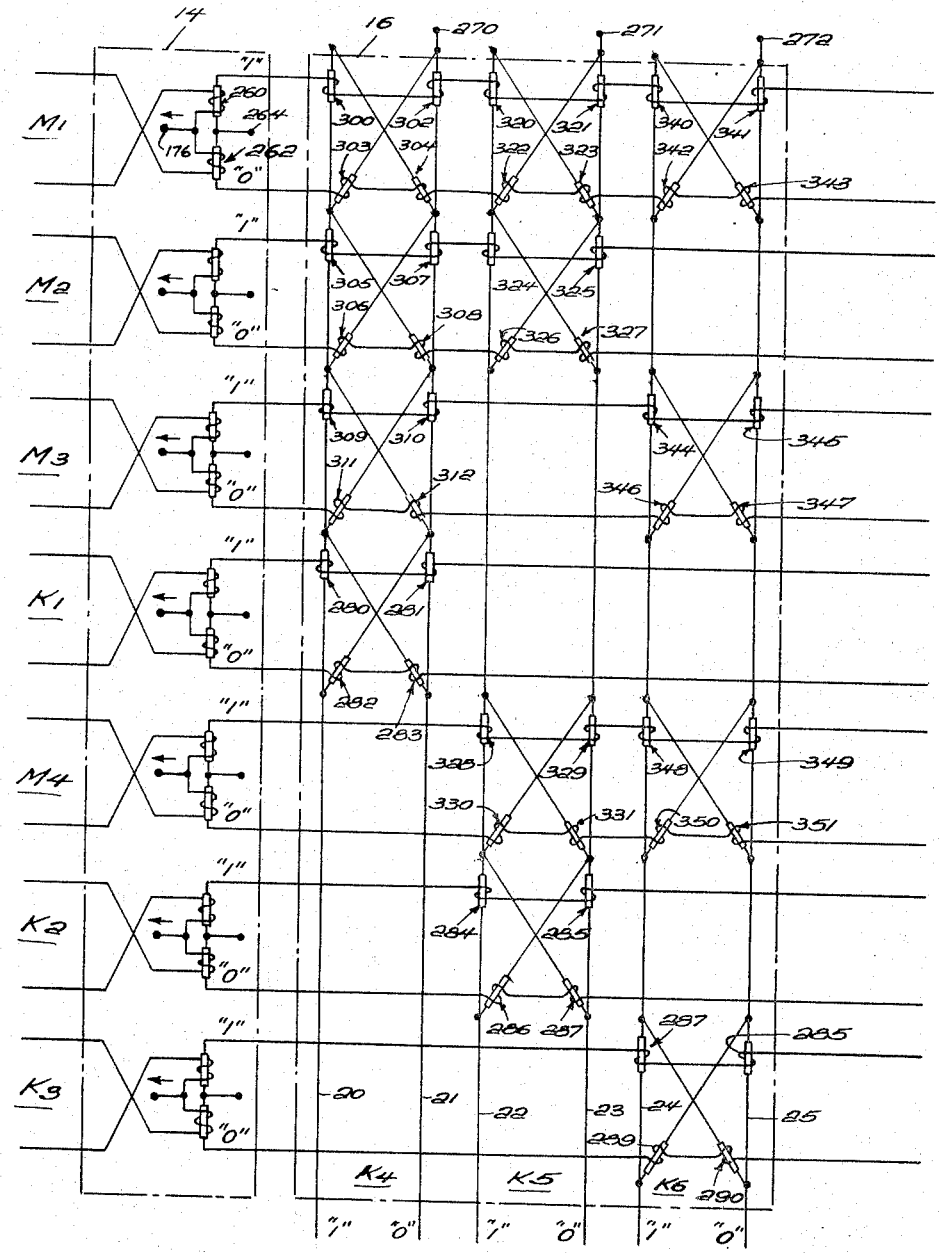
FIG. 5 shows in detail the buffer and decoder of FIG. 1.

Reference is made to FIG. 5 for a detailed illustration of the buffer 14 shown in block form in FIG. 1. The buffer 14 in FIG. 5 serves to isolate the encoder 12 in FIG. 4 from the decoder 16 in FIG. 5. The buffer 14 in FIG. 5 includes a pair of cryotrons for each channel which are connected as shown. A detailed explanation of the operation of one pair of such cryotrons in one channel should suffice for an understanding of how the cryotrons in the remaining channels operate. Taking channel M1, for example, the cryotrons 260 and 262 are connected as shown with the coil of the cryotron 260 being connected to the Zero line of channel M1 and the coil of the cryotron 262 being connected to the One line of this channel. The gates of the cryotrons 260 and 262 are connected together, and current is supplied to the common connection through a terminal 264. Whenever current flows through the coil of the cryotron 260, this cryotron is rendered normal, and current through the terminal 264 flows through the superconductive cryotron 262 and along to the right on the Zero line of the channel M1. Whenever current flows through the coil of the cryotron 262, the current through the terminal 264 is diverted through the gate of the cryotron 260 and then along to the right on the One line of the channel M1. Current in the coils of the cryotrons 260 or 262 exits through the terminal 176 as indicated by the arrow adjacent thereto. It is seen, therefore, that the buffer for the channel M1 which includes the cryotrons 260 and 262 serves to electrically isolate the circuits of the decoder 16 in FIG. 5 from the circuits of the encoder 12 in FIG. 4 as far as the channel M1 is concerned. The buffer cryotrons for the channels M2 through M4 and K1 through K3 perform in like fashion for these respective channels.

The decoder 16, illustrated in block form in FIG. 1, is shown in detail in FIG. 5. The decoder 16 in FIG. 5 responds to signals on the channels M1 through M4 and K1 through K3 and current supplied to the terminals 270 through 272 to provide output signal combinations on the lines 20 through 25. The output signal combinations on the lines 20 through 25 are arbitrarily designated as code channels K4, K5 and K6. The lines 20 and 21 constitute the One and Zero lines respectively of channel K4. The lines 22 and 23 constitute the respective One and Zero lines of channel K5, and the lines 24 and 25 constitute the One and Zero lines respectively of the channel K6. During normal operation, there are no defects in the channels M1 through M4 and K1 through K3. At such times the decoder 16 provides a current in the Zero lines of channels K4 through K6. Consequently, the lines 21, 23 and 25 each carry current in this instance; whereas, the lines 20, 22 and 25 carry no current. In case there is a broken wire causing an open circuit condition in one of the channels M1 through M4 or K1 through K3, current in such channels from the buffer 14 will not flow in the line which is open although current will flow in the alternate line of such channel. The current however in the alternate line of such channel is reduced slightly since this current must flow through the resistance of one gate. The magnitude of the reduced current, however, is not below the critical current required to operate the cryotrons in the decoder 16.

To illustrate, assume that the Zero line of channel M1 is broken somewhere between the sending and receiving plates in FIGS. 1 and 2, whereby an open circuit condition exists. Assume further that one of the code combinations illustrated in Table I above is being transmitted and that channel M1 is conveying a Zero. Current from the terminal 264 in FIG. 5 normally would flow through the gate of the cryotron 262 and then along the Zero line of channel M1. Since the Zero line of channel M1 is open under the assumed circumstances, no current may flow along this line, and as a result current from the terminal 262 must flow through the gate element of the buffer cryotron 260 on to the One line of channel M1. The gate element of the buffer cryotron 260 is resistive whenever channel M1 is conveying a Zero. Consequently, the current from the terminal 264 is reduced slightly in magnitude by an amount proportional to the resistance of the gate element of the cryotron 260. By a judicious selection of cryotrons for use in the decoder 16 in FIG. 5, this reduction in current can be such as not to be below the critical current for operating these cryotrons. Consequently, the cryotrons 300, 302, 320, 321, 340 and 341 become resistive when they should be superconductive; whereas the cryotrons 303, 304, 322, 323, 342 and 343 become superconductive when they should be normal. The code channels K4, K5 and K6 indicate such a defective condition to the multiposition switch 30 in FIGS. 1 and 7 by sending code number 1 of Table II below. The various signal combinations supplied on the channels K4 through K6 to the multiposition switch 30 in FIGS. 1 and 7 for defects in any given channel are indicated in Table II below.

TABLE II

| Code Number | Code Combinations | | | Defective Channel |
|---|---|---|---|---|
| | K4 | K5 | K6 | |
| 1 | 1 | 1 | 1 | M1. |
| 2 | 1 | 1 | 0 | M2. |
| 3 | 1 | 0 | 1 | M3. |
| 4 | 1 | 0 | 0 | K1. |
| 5 | 0 | 1 | 1 | M4. |
| 6 | 0 | 1 | 0 | K2. |
| 7 | 0 | 0 | 1 | K3. |
| 8 | 0 | 0 | 0 | None. |

A more detailed explanation of the construction and operation of the decoder 16 in FIG. 5 is appropriate at this point. Note that the arrangement of the decoder 16 is identical to that of the encoder 12 in FIG. 4 as far as the channels M1 through M4 are concerned. For the channels K1 through K3 the decoder 16 in FIG. 5 includes an additional pair of cryotrons for each of the two lines of these channels. More specifically, the decoder 16 in FIG. 5 includes four additional cryotrons 280 through 283 for the code channel K1; it includes four additional cryotrons 284 through 287 for the code channel K2; and it includes four additional cryotrons 287 through 290 for the code channel K3. These additional cryotrons in the code channels K1, K2 and K3 operate in conjunction with the other cryotrons in the decoder 16 to generate parity signals on the channels K4, K5 and K6. The cryotrons 280 through 283 and 300 through 312 operate in response to signals on the channels M1 through M3 and K1 to divert the current supplied to the terminal 270 back and forth between the lines 20 and 21 of channel K4 to generate a parity bit for this channel. During normal operation when correct transmissions are being effected, the parity bit generated on the channel K4 is Zero. Accordingly, the code channel K1 should represent a Zero whenever the number of Ones in channels M1, M2 and M3 is an even number. On the other hand, when the number of Ones in the channels M1, M2 and M3 is an odd number, the code channel K1 must then indicate a One. It is seen, therefore, that an even parity is generated on the code channel K4. During error-free transmission the total number of Ones presented by channels M1 through M3 and K1 must equal an even number. This may be readily verified by noting Table I. Noting the value three in this table for instance, channels M1 and M2 each contain a One, and the channel M3 contains a Zero. Since the total number of Ones in the channels M1 through M3 is an even number, i.e., two, the code bit K1 must be a Zero. Note that the total number of Ones in channels M1 through M3 and K1 is an even number, i.e., two. For a case where the total number of Ones for the channels M1 through M3 is an odd number, note value 15. In this instance, each of the channels M1 through M3 has a One, and the total number of Ones is hence an odd number of three. Therefore, the code channel K1 must have a One. Hence the total number of Ones for the channels M1 through M3 and K1 is an even number of four Ones.

The code channel K5 generates an even parity for channels M1, M2, M4 and K2. The cryotrons 284 through 287 and 320 through 331 generate the parity for code channels K5 by diverting the current from the terminal 271 back and forth between the lines 22 and 23 in response to information supplied on channels M1, M2, M4 and K2.

The code channel K6 generates even parity for channels M1, M3, M4 and K3. The cryotrons 287 through 290 and 340 through 351 generate parity for code channel K6 by diverting the current from the terminal 272 back and forth between the lines 24 and 25 in response to information received on the channels M1, M3, M4 and K3

In order to illustrate the overall operation of the decoder 16 in FIG. 5, assume that there is a correct transmission of the value 11 in Table I to the decoder 16 on channels M1 through M4 and K1 through K3. Considering first channel K4, current from the terminal 270 is diverted to the line 20 because the gate of cryotron 302 is resistive and the gate of cryotron 303 is superconductive. The current is then diverted back to the line 21 because the cryotron 305 in channel M2 is resistive and the cryotron 308 is superconductive. The current then proceeds down line 21 because the gate elements of the crytron 310 in channel M3 and the cryotron 281 in channel K1 are superconductive; whereas the gate elements of the cryotrons 311 and 282 in respective channels M3 and K1 are resistive. The presence of a current on the line 21 and absence of a current on the line 20 indicates a Zero for channel K4.

Considering next the generation of code bit K5, current from the terminal 271 is diverted from the line 23 to the line 22 because the gate element of the cryotron 321 is resistive and the gate element of the cryotron 322 is normal. Current is then diverted at channel M2 from the line 22 back to the line 23 because the gate element of the cryotron 324 is resistive and the gate element of the cryotron 327 is superconductive. The current is diverted at channel M4 back to the line 22 from line 23 because the gate element of the cryotron 329 is resistive and the gate of the cryotron 330 is superconductive. Current is again diverted at the channel K2 from the line 22 back to the line 23 because the gate element of the cryotron 284 is resistive and the gate of the cryotron 287 is superconductive. The current then proceeds along the line 23, indicating a Zero for code channel 5.

Considering next the generation of the code bit K6, current from the terminal 272 is diverted from the line 25 to the line 24 because the gate element of the cryotron 341 is resistive and the gate element of the cryotron 342 is superconductive. The current proceeds along the line 24 through the superconductive gate 344 of the channel M3 and is diverted at the channel M4 by the resistive gate of the cryotron 348 from the line 24 through the superconductive gate of the cryotron 351 to the line 25. Current then proceeds along the line 25 past the channel K3 because the gate of the cryotron 288 is superconductive and the gate of the cryotron 289 is normal. This current flow indicates a Zero for the code channel K6.

It is seen, therefore, how the decoder 16 in FIG. 5 generates a Zero for each of the code bits K4, K5 and K6 whenever the value 11 in Table I is applied without an error on the channels M1 through M4 and K1 through K3. By proceeding in like fashion as above for the remaining values in Table I, it can be easily determined that the decoder 16 in FIG. 5 generates Zeros for each of the code channels K4 through K6 whenever the remaining values in Table I are applied to the decoder 16 on channels M1 through M4 and K1 through K3.

In order to illustrate how the decoder 16 indicates a defective channel, let it be assumed that the value 11 in Table I is sent correctly from the register 10 in FIG. 4 to the buffer 14 in FIG. 5 on channels M1 through M4 and K1 through K3. Let it be assumed further that the One line of channel M1 is broken at a point, for example, indicated by the numeral 360 in FIG. 6. For this value in Table I the current from the terminal 264 normally flows through the superconductive gate of the cryotron 260 on the One line of channel K1, but in this instance the current is forced through the resistive gate of the cryotron 262 on to the Zero line of channel M1 since the One line is open. The resistance of the gate of the cryotron 262 reduces the amplitude of the current along the Zero line slightly, but it nevertheless exceeds the critical current for operating the gates of the cryotrons 303, 304, 322, 323, 342 and 343. Consequently, the gate elements of these cryotrons become resistive, and the gate elements of the cryotrons 300, 302, 320, 321, 340 and 341 become superconductive because no current flows in the One line of the channel M1. Channel M1 is thus defective, and this condition should be detected by the information generated on code channels K4, K5 and K6.

Taking the channel K4 first, current from the terminal 270 flows along the line 21 past channel M1 because the gate of the cryotron 303 is resistive and the gate of the cryotron 302 is superconductive. The current is diverted at the channel M2 from the line 21 to the line 20 because the gate of the cryotron 307 is resistive and the gate of the cryotron 306 is superconductive. The current flows along the line 20 past the channel M3 because the gate of the cryotron 312 is resistive and the gate of the cryotron 309 is superconductive. The current continues on the line 20 past the channel K1 because the gate of the cryotron 283 is resistive and the gate of the cryotron 280 is superconductive. A current on the line 20 with no current on the line 21 represents a One for channel K4.

Taking code bit K5 next, the current from the terminal 271 flows along the line 23 past the channel M1 because the gate of the cryotron 322 is resistive and the gate of the cryotron 321 is superconductive. The current is diverted from the line 23 to the line 22 at channel M2 because the gate of the cryotron 325 is resistive and the gate of the cryotron 326 is superconductive. The current then flows along the line 22 past channels M3 and K1 since these channels do not affect current in the line 22. The current in the line 22 is diverted back to the line 23 at channel M4 because the gate of the cryotron 328 is resistive and the gate of the cryotron 331 is superconductive. The current is diverted from the line 23 to the line 22 at the channel K2 because the gate of the cryotron 285 is resistive and the gate of the cryotron 286 is superconductive. Current flows along the line 22 from the decoder 16, indicating a One for code channel K5.

Taking code bit 6 next, current from the terminal 272 flows along the line 25 past the channel M1 because the gate of the cryotron 342 is resistive and the gate of the cryotron 341 is superconductive. The current flows along the line 25 past the channel M2 since this channel has no effect on this line. The current continues to flow along the line 25 past the channel M3 because the gate of the cryotron 346 is resistive and the gate of the cryotron 345 is superconductive. The current continues along the line 25 past the channel K1 because this channel has no effect on this line. The current is diverted from the line 25 to the line 24 at the channel M4 because the gate of the cryotron 349 is resistive and the gate of the cryotron 350 is superconductive. The current continues along the line 24 past the channel K2 since this channel has no effect on this line. The current continues along the line 24 past the channel K3 because the gate of the cryotron 287 is superconductive and the gate of the cryotron 290 is resistive. The current continues on the line 24 from the decoder 16, indicating a One for code bit K6.

It is seen, therefore, that a One is generated on each of the code channels K4, K5 and K6 for the defective condition assumed above. Table II above indicates the defective channel for each combination of the code bits K4, K5 and K6. If a defect is assumed in any one of the remaining channels M2 through M4 and K1 through K3, it can be determined by proceeding in the above fashion that the various combinations of signals for the code bits K4, K5 and K6 in Table II are generated for the various channels indicated when a defect occurs in such channel.

It is appropriate at this point to see how the multiposition switch 80, illustrated in block form in FIG. 1, responds to the data on code channels K4 through K6 to indicate a defective channel. Referring next to FIG. 7, which shows the multiposition switch 30 in detail, this switch includes gates 370 through 377 with the lines 20 through 25 of the code channels K4 through K6 wound about the gates as shown. Current from a terminal 380 flows through one, and only one, of the gate elements 370 through 377 for each of the signal combinations of the code bits 24 through K6 shown in Table II above. Stated otherwise, each of the code combinations in Table II selects a different one of the gate elements 370 through 377. The selected one of the gates 370 through 377 continues in the superconductive state; whereas, the nonselected Ones of these gates are rendered normal. Because of their resistance, the normal gates divert current from the terminal 380 to the superconductive gate. The logic employed in the multiposition switch 30 is negative logic in the sense that signals on the code channels K4 through K6 are effective to deselect whatever gates are energized thereby, deselection meaning the energized gates are driven normal. Note, for example, that when code channel K4 has a One, the line 20 is energized, and windings 390 through 393 apply a magnetic field to the gates 370 through 373, respectively, to drive these gates resistive. Whenever the code channel K4 has a Zero, the line 21 is energized and the windings 394 through 397 are energized and drive respective gates 374 through 377 resistive. It is seen, therefore, that code channel K4 deselects either the upper or the lower half of the gates 370 through 377 since a current always flows on either the One or Zero line. When the code channel K5 has a One, the line 22 is energized with a current, and the windings 398 through 401 drive the respective gates 370, 371, 374 and 375 resistive. When the code channel K5 has a Zero, the line 23 is energized with the current, and the windings 402 through 405 drive the respective gates 372, 373, 376 and 377 resistive. It is readily seen that the code channel K5 serves to deselect two of the gates in the upper half or two of the gates in the lower half of the multiposition switch 30. Since the code channel K4 deselects either the upper or the lower half of the gates 370 through 377 and the code channel K5 deselects half of the four remaining gates in either the upper or the lower half of the gates 370 through 377, it is easily seen that the function of the code channel K6 is to eliminate either of the two remaining gates in the upper or the lower half of the multiposition switch 30. If the code channel K6 has a One, the line 24 is energized and the windings 406 through 409 drive respective gates 370, 372, 374 and 376 resistive. If the code channel K6 has a Zero, the line 25 is energized, and the windings 410 through 413 drive the respective gates 371, 373, 375 and 377 resistive. It is easily seen that the code bit K6 deselects and drives resistive alternate Ones of the gates 370 through 377 if the line 24 is energized, and the remaining alternate gates are deselected by driving them resistive if the line 25 is energized. It is seen, therefore, that the code channels K4, K5 and K6 ultimately select One, and only One, of the gate elements 370 through 377, and the selected gate element remains superconductive while the deselected gate elements are driven resistive. Consequently, current from the terminal 380 is diverted by the deselected resistive gates to the selected superconductive One of the gates 370 through 377, and current flows through the selected gate to an associated one of the lines 31 through 38.

Referring next to FIG. 8, the switch control 40, illustrated in block form in FIG. 1, is shown in detail. During normal operation when error-free transmissions are being made, the code channels K4, K5 and K6 each present a Zero to the multiposition switch 30 in FIG. 7. This causes the gate element 370 to be selected, and current from the terminal 380 in FIG. 7 is diverted through this gate to the line 38. Current on this line is ineffective to operate the switch control 40 in FIG. 8, and the current is returned to its current source. Whenever current is supplied on one of the lines 31 through 37 from the multiposition switch 30 in FIG. 7 to the switch control 40 in FIG. 8, this current is effective in conjunction with another current supplied on one of the lines 50 through 54 from the shift register 46 to operate the switch control 40. The switch control 40 in FIG. 8 includes a first column of cryotrons 430 through 436 and a second column of cryotrons 440 through 446. Additional columns of cryotrons, not shown for simplicity of illustration, are usually employed in practice. Each cryotron includes two control windings. The cryotron 430, for example, has control windings 450 and 451 disposed thereon. Likewise, the cryotron 440 has two control windings 452 and 453 disposed thereon. The cryotrons of the switch control 40 must be energized by coincident currents applied to the control windings in order for the gate elements of these cryotrons to be driven resistive. The currents are applied by horizontal lines 31 through 37 and vertical lines 50 through 54. Current is supplied from one horizontal line and one vertical line at any givent ime. Therefore, only one of the cryotrons in the switch control 40 may be driven resistive at any one time.

In order to illustrate the operation of the switch control 40 in FIG. 8. assume that a current flows in the horizontal line 31 and a current flows in the vertical line 50. The current in the horizontal line 31 energizes the coil 450, but the magnetic field applied to the gate of the cryotron 430 by this current is less than the critical field of the gate. Hence, this current alone is not sufficient to drive this gate resistive. Likewise, the cryotron 440 has a magnetic field applied thereto by the current in the line 31, but the magnetic field developed on the gate of the cryotron 440 is below the critical field for this gate and thus does not drive the gate resistive. No current flows in the vertical line 54, and the cryotrons 441 through 446 continue superconductive. Accordingly, the gates in the cryotrons 440 through 446 continue superconductive. The current in the line 50 energizes the right-hand coil on each of the cryotrons 430 through 436. This current develops a magnetic force on the gates in each of these cryotrons, but the magnetic field is less than the critical field of these gates. Accordingly, the gates of cryotrons 431 through 436 continue superconductive. The current in the vertical line 50 energizes the coil 451 on the cryotron 430. This current alone does not develop a magnetic field in the coil 451 sufficient in magnitude to exceed the critical field of the gate of the cryotron 430. However, the magnetic field produced by the winding 451 and the magnetic field produced by the winding 450 are sufficient in combination to exceed the critical field of the gate of the cryotron 430. The windings 450 and 451 are disposed on the gate of the cryotron 430 in such a manner that their magnetic fields aid each other. The combined field produced by the two windings 450 and 451 is sufficient, therefore, to exceed the critical field of the gate of the cryotron 430. Accordingly, when the horizontal line 31 and the vertical line 50 are energized with currents, only the gate of the cryotron 430 is driven resistive.

The shift register 46, illustrated in block form in FIG. 1, is shown in detail in FIG. 8. This shift register supplies a current to a given one of the vertical lines 50 through 54 in FIG. 1. Only the lines 50 and 54 are illustrated in FIG. 8. The shift register 46 in FIG. 8 is similar to the one illustrated and described in the article, "The Cryotron— A Superconductive Computer Component," in the Proceedings of the IRE for April 1956 by D. A. Buck. Since this type of shift register is now well known and since it is described in the foregoing article, a detailed description of its construction and operation is unnecessary here. The shift register 46 is illustrated with two stages 460 and 461. The stage 460 includes a pair of flip-flops 465 and 466, and the stage 461 includes a pair of flip-flops 467 and 468. The shift register control 42 in FIG. 7 supplies current pulses alternately to the lines 43 and 44 to effect stepping of the shift register 46. Pulses on the line 43 may be termed A pulses, and pulses on the line 44 may be termed B pulses, consistent with the terminology employed in the aforementioned article. The shift register 46 is stepped once each time an A pulse and a B pulse are applied. Initially, the shift register 46 is reset, and the first pair of A and B pulses energizes the vertical line 50 in FIG. 8. The second set of A and B pulses energizes the line 54. While only two stages have been illustrated for the shift register 46, any number of stages may be employed in practice. This shift register serves to indicate the next spare channel which may be used to replace a defective channel. Accordingly, the number of stages employed in this shift register should equal the number of spare channels. Initially when a defect occurs in any channel, the first stage of the shift register is operated to replace the defective channel with the first step of spare lines S1. Each time an error occurs thereafter, the shift register is stepped once. When the last spare channel has been used, the last stage 461 of the shift register operates an alarm 470 to indicate that no further spare channels are available.

Pairs of A and B pulses for operating the shift register 46 in FIG. 8 are supplied by the shift register control 42 in FIG. 7. This shift register control receives signals from the multiposition switch 30 in FIG. 7 on the lines 20 through 25 of the code channels K4 through K6. These signals control the path through which current flows from a terminal 472 in the shift register control. It is recalled that during normal error-free operation, current flows only in the lines 21, 23 and 25. During such periods, the gates of the cryotrons 475 through 477 are maintained resistive. Consequently, current from the terminal 472 is diverted through the gates of the cryotrons 478 through 480 which are superconductive. Accordingly, during normal error-free operation, current flows through the conductor 43 from the terminal 472. Such current flow is termed an A pulse. Whenever one of the channels K4 through K6 has a One instead of a Zero, a defective channel is indicated as explained previously, and one of the gates of the cryotrons 475 through 477 goes superconductive. At the same time one of the gates in the cryotrons 478 through 480 goes resistive. Consequently, current flows through the superconductive one of the gates of the cryotrons 475 through 477 to the line 44. A pulse on this line is termed a B pulse. The B pulse is effective to energize one of the vertical lines 50 through 54 in FIG. 8 and ultimately to cause switching of a spare channel in place of the defective channel. If the spare channel corrects the defect, the code bits K4 through K6 again generate Zeros, indicating error-free operation. In this instance the gates of the cryotrons 475 through 477 again become resistive, and each of the cryotrons 478 through 480 become superconductive. As a result, current flow along the line 44 terminates and current then flows again in the line 43. This, in effect, terminates the B pulse and initiates the next A pulse. It is seen, therefore, that an A pulse and a B pulse are effective in combination to step the shift register 46. The A pulse continues during error-free operation while the B pulse exists during corrective action.

The switch control 40 in FIG. 1 supplies signals on the lines 60 through 64 to operate the replacement switch 18. The replacement switch 18 serves to substitute a spare channel for a defective channel. The manner in which this is performed may be understood by referring to FIG. 6 which illustrates the replacement switch in detail. Referring next to FIG. 6, this switch has a first column of cryotron switches 500 through 506 and a second column of cryotron switches 507 through 513. Note that there is one switch in each column for each of the channels M1 through M4 and K1 through K3. Each of the cryotron switches is a flip-flop of the type illustrated in the sending register 10 in FIG. 4. Note that the flip-flop 500, illustrated in detail in FIG. 6, has the usual arrangement of 6 cryotrons, but both cryotrons 520 and 521 serve as output cryotrons which are both resistive or both superconductive. The cryotrons 522 and 523 are cross-coupled to serve as the flip-flop cryotrons. The cryotron 524 in FIG. 6 and the cryotron 430 in FIG. 8 serve as input cryotrons for the flip-flop 500 in FIG. 6. The flip-flop switches 501 through 506 in FIG. 6 have a corresponding one of the cryotrons 431 through 436 in FIG. 8 as one of their input cryotrons. Likewise, the switches 507 through 513 in FIG. 6 have a corresponding one of the cryotrons 440 through 446 in FIG. 8 as one of their input cryotrons.

An explanation of the operation of the switch 500 in FIG. 6 should suffice for understanding of the operation of the remaining switches 501 through 513. Initially, the switch 500 and each of the remaining switches 501 through 513 are set in the Zero state. When an error occurs and a given switch is selected, it is changed from the Zero state to the One state in order to substitute a spare channel for a defective channel. The switch 500, for example, is initially set in the Zero state by a current on the reset line 530. A current on the reset line 531 sets the switches 507 through 513 to the Zero state. A current on the line 530 energizes the coil of the cryotron 524 and drives its gate resistive. Consequently, current applied to a terminal 532 is diverted along the right-hand line 60 to the gate of the cryotron 430 in FIG. 8 and back along the left-hand line 60 to the gate of the cryotron 522, then through the coil of the cryotron 523, the coil of the cryotron 521, the coil of the cryotron 520 to an exit terminal 533. Accordingly, the gates of the cryotrons 520, 521 and 523 are driven resistive, and when the One and Zero line of channel M1 are not defective or open, the current flowing along either the One or the Zero line of the channel M1 cannot flow through the gates of either of the cryotrons 520 or 521 to the respective lines 540 or 541 which constitute the lines of the spare channel S1. With the flip-flop switch 500 reset to the Zero state the spare channel S1 in effect is isolated electrically from the channel M1 by the resistive state of the gates of the cryotrons 520 and 521.

Should an open circuit occur at the point 360 in FIG. 6 on the One line of the channel M1, this defective condition causes the multiposition switch 30 in FIG. 7 to energize the coil 450 in FIG. 8. If the shift register 46 energizes the line 50, then the coil 451 is energized, and the gate of the cryotron 430 is driven resistive. Consequently, current from the terminal 532 in the switch 500 in FIG. 6 is diverted through the gate of the cryotron 524, through the gate of the cryotron 523, through the coil of the cryotron 522 to the exit terminal 533. Consequently, the flip-flop switch 500 changes from the Zero state to the One state, and the gates of the cryotrons 520, 522 and 523 become superconductive. Therefore, the lines 540 and 541 of the spare channel S1 are connected through the superconductive gates of the cryotrons 520 and 521 to the respective One and Zero lines of the channel M1. The switches 501 through 506 operate in like fashion to that of the switch 500 should a break occur in a respective one of the channels M2, M3, K1, M4, K2 or K3. It is pointed out that whenever any one of the switches 500 through 506 is operated to connect the spare channel S1 to a defective one of the channels M1 through M4 or K1 through K3, the shaft register 46 in FIG. 8 is stepped to the next stage, and upon the occurrence of a subsequent defective channel, one of the switches 507 through 513 is operated to replace the defective channel with the spare channel S2. In practice there are many columns of switches in the replacement switch 18 although as a matter of convenience only two columns of switches are shown.

In order to illustrate the overall operation of the device shown in FIGS. 4 through 8, assume that value 11 in Table I above is established in the sending register 10 and that the One line of channel M1 is broken at the point 360 in FIG. 6. The channel M1 has a current established in the One line by the flip-flop 130, and this current flows to the buffer 14 in FIG. 5. At this point the current from the terminal 264 in FIG. 5 is unable to flow along the One line of channel M1 because this line is broken at point 360 in FIG. 6. Consequently, current from the terminal 264 flows through the gate of the cryotron 262 on the Zero line of channel M1. The flip-flop 131 in FIG. 4 causes a current to flow along the One line of channel M2. Since this channel is not defective, a current on the One line of channel M2 passes from the sending register 10 in FIG. 4 through the encoder 12 in FIG. 4, the buffer 14 in FIG. 5, the decoder 16 in FIG. 5, the replacement switch 18 in FIG. 6, the replacement switch 70 in FIG. 2, and the decoder 72 in FIG. 2 to the receiving register 74 in FIG. 2. In like fashion, the flip-flops 132 and 133 of the sending register 10 in FIG. 4 establish a Zero and One on respective channels M3 and M4, and this information ultimately is established in the receiving register 74 in FIG. 2. It is pointed out that the value 11 in Table I is transmitted correctly from the sending register 10 in FIG. 4 to the buffer 14 in FIG. 5. Consequently, the encoder 12 in FIG. 4 generates the correct code bits for channels K1, K2 and K3 which is a Zero for channel K1, a One for channel K2 and a Zero for channel K3 as indicated in Table I.

Because of the defective condition assumed for channel M1, the Zero line of this channel carries current which the One line should normally carry. As a result the cryotrons 303, 304, 322, 323, 342 and 343 have their gate elements rendered resistive, and the cryotrons 300, 302, 320, 321, 340 and 341 have their gates rendered superconductive. The decoder 16 in FIG. 5 detects the defective condition in channel M1 and establishes a One in each of the channels K4 through K6 as indicated in Table II. This combination of signals on these channels renders the gate 377 of the multiposition switch 30 in FIG. 7 superconductive, thereby diverting current from the terminal 380 in FIG. 7 through the gate 377 and along the line 31 in FIG. 8. This indicates that channel M1 is defective as illustrated in Table II. The current flow in the line 31 energizes the coils 450 and 452 in FIG. 8, but the magnetic field produced is not sufficient to drive the gates of the cryotrons 430 and 440 resistive. The current flowing in the lines 20, 22 and 24 of respective channels K4, K5 and K6 in FIG. 7 causes current from the terminal 472 of the shift register control 42 in this figure to be diverted through one or more of the gates of the cryotrons 475 through 477. Consequently, current flow is established in the line 44 of FIG. 8. If it is assumed that the shift register 46 in FIG. 8 has been initially set up to select the output line 50, then the current on the line 44 flows through the coil of the cryotron 469, the superconductive gate of the cryotron 471, the coils of the cryotrons 430 through 436 and though the second stage 461 of the shift register 46 back to the current source. The gate of the cryotron 430 in FIG. 8 is rendered resistive by the combined fields from the coils 450 and 451. This causes the switch 500 in FIG. 6 to change from the Zero state to the One state whereby the gates of the cryotrons 520 and 521 are changed from the resistive state to the superconductive state. Hence the One and Zero lines of the channel M1 are connected through the superconductive gates of the cryotrons 520 and 521 to the respective lines 540 and 541 of the spare channel S1. At this instant, current from the terminal 264 of the buffer 14 in FIG. 4 is able to flow through the superconductive gate of the cryotron 260 along the One line of the channel M1 and through the superconductive gate of the cryotron 520 in FIG. 6 to the line 540. The line 540 serves as the One line of the spare channel S1. It should be pointed out that the replacement switch 70 in FIG. 2 is operated simultaneously with the replacement switch in FIGS. 1 and 6. As the switch 500 in FIG. 6 is operated to connect the left end of the spare channel S1 across the defective channel M1 at the replacement switch 18, a corresponding switch in the replacement switch 70 in FIG. 2 is simultaneously operated to connect the opposite end or the right end of the spare channel S1 to the defective channel M1 at the replacement switch 70 in this figure. As soon as current begins to flow from the buffer 14 in FIG. 5 along the line 540 of the spare channel S1, the decoder 16 in FIG. 5 changes and generates a Zero for each of the code bits K4 through K6; whereupon the gate 377 of the multiposition switch 30 in FIG. 7 goes resistive and diverts current from the terminal 380 to the superconductive gate 370, thereby de-energizing the switch control 40 in FIG. 8; and current from the terminal 472 of the shift register control 42 in FIG. 7 is diverted from the line 44 in FIG. 8 to the line 43 in this figure. Consequently, the B pulse to the shift register 46 in FIG. 8 is terminated and the subsequent A pulse is initiated. This steps the shift register to the second stage 461 so that a subsequent defective channel may be replaced with the spare channel S2 in FIG. 6. If one of the channels M1 through M4 or K1 through K3 later develops a broken line somewhere between the sending plate in FIG. 1 and the receiving plate in FIG. 2, a corresponding one of the switches 507 through 513 in FIG. 6 operates to substitute the spare channel S2 for such defective channel.

It is seen, therefore, that the device of FIGS. 1 and 2 can detect where a defect exists in any one of a group of transmission channels and switch in a given one of a group of spare channels to replace the defective channel. As long as errors occur one at a time the number of defective channels which may be corrected in this manner is limited only by the number of spare channels available. It should be pointed out that a spare channel might be switched in for a defective channel and later become defective. In this case, another spare channel can be substituted for the previous spare channel. Note that in the above illustration where spare channel S1 is substituted for the defective channel M1, if a break later develops in the spare channel S1 between the sending plate in FIG. 1 and the receiving plate in FIG. 2, the spare channel S2 may be substituted for the defective spare channel S1 when the switch 507 is operated. In this case current may flow from the One and Zero lines of the channel M1 through the gates of respective cryotrons 550 and 551 to corresponding lines 552 and 553 which constitute the spare channel S2.

Accordingly, a novel circuit arrangement is provided which checks data transmitted from one location to another, provides an indication when a defect exists in any channel, identifies the channel which has the defect, and substitutes one of the plurality of spare channels for the defective channel. The number of spare channels available may be as many as desired, and the substitution of spare channels for defective channels may be done automatically. It is to be understood that the code checking system herein illustrated is by way of demonstration and that other suitable code checking systems readily may be employed.

What is claimed is:

1. A device for sending information signals from one location to another along a plurality of channels, the device including a sending mechanism and a receiving mechanism, a plurality of M information channels, a plurality of K code channels, and a plurality of S spare channels disposed between said sending mechanism and said receiving mechanism, said sending mechanism including a buffer storage register having outputs coupled to the M information channels and K code channels, a first decoder coupled to said buffer storage register, a first replacement switch disposed between said first decoder and said M information channels, said K code channels, and said S spare channels, a first multi-position switch coupled to said first decoder, a first switch control circuit coupled between said first replacement switch and said multi-position switch, said receiving mechanism including a receiving register, a second decoder coupled to said receiving register, a second replacement switch disposed between said second decoder and said M information channels, said K code channels and said S spare channels, a second multi-position switch coupled to said second decoder, a second switch control circuit coupled between said second replacement switch and said second multi-position switch, said first and second decoders responding to fault indicating combinations of signals on said M information channels and K code channels to operate automatically said first and second multi-position switches which in turn automatically operate said first and second switch control circuit which thereupon automatically operate said replacement switches to substitute any one of the S spare channels for any one of the M informations channels, first and second storage means coupled to the respective first and second switch controls for indicating the next available S spare channel, said first and second storage means being coupled to and operated by the respective first and second multi-position switches each time the first and second replacement switches are operated.

2. The apparatus of claim 1 wherein cryogenic devices are employed in its construction.

3. The apparatus of claim 1 wherein cryotrons are employed in the construction.

References Cited

UNITED STATES PATENTS

| | | | |
|---|---|---|---|
| 1,922,059 | 8/1933 | Ohl | 340—147 |
| 2,279,295 | 4/1952 | Blanton | 340—147 |
| 2,680,162 | 6/1954 | Brehm | 179—175.3 |
| 2,936,442 | 5/1960 | Christmon et al. | 340—147 |
| 2,966,647 | 12/1960 | Lentz | 340—173.1 |
| 3,011,711 | 12/1961 | Buck | 340—173.14 |
| 3,027,542 | 3/1962 | Silva | 340—146.2 X |
| 3,078,443 | 2/1963 | Rose | 340—146.1 |
| 3,093,749 | 6/1963 | Dillingham | 340—173.14 |
| 3,111,624 | 11/1963 | Farkas | 340—147 |

FOREIGN PATENTS 211,165  10/1957  Australia.

OTHER REFERENCES

Buck, "The Cryotron—A Superconductive Computer Component," Proceedings of the I.R.E., vol. No. 4, April 1956.

THOMAS B. HABECKER, *Acting Primary Examiner.*

E. R. REYNOLDS, NEIL C. READ, *Examiners.*

V. CARNEY, H. I. PITTS, *Assistant Examiners.*